(12) United States Patent
Burke, Jr.

(10) Patent No.: US 8,810,821 B2
(45) Date of Patent: Aug. 19, 2014

(54) METHOD AND SYSTEM FOR MANAGING SERVICE ACTIVITY IN A NETWORK PRINTING CONTEXT USING A CLOUD ADMINISTRATION SYSTEM

(71) Applicant: Xerox Corporation, Norwalk, CT (US)

(72) Inventor: Robert William Burke, Jr., Stanley, NY (US)

(73) Assignee: Xerox Corporation, Norwalk, CT (US)

( * ) Notice: Subject to any disclaimer, the term of this patent is extended or adjusted under 35 U.S.C. 154(b) by 77 days.

(21) Appl. No.: 13/723,523

(22) Filed: Dec. 21, 2012

(65) Prior Publication Data

US 2014/0176972 A1 Jun. 26, 2014

(51) Int. Cl.
*G06F 3/12* (2006.01)
*G06K 15/02* (2006.01)

(52) U.S. Cl.
CPC ..................... *G06K 15/02* (2013.01)
USPC ........ 358/1.13; 358/1.14; 358/1.15; 358/1.16

(58) Field of Classification Search
None
See application file for complete search history.

(56) References Cited

U.S. PATENT DOCUMENTS

| 5,305,199 | A | 4/1994 | LoBiondo et al. |
|---|---|---|---|
| 6,304,732 | B1 | 10/2001 | Myers et al. |
| 6,647,222 | B1 | 11/2003 | Digby et al. |
| 7,317,882 | B2 | 1/2008 | Dombrowski |
| 7,574,496 | B2 | 8/2009 | McCrory et al. |
| 7,587,146 | B2 | 9/2009 | Horn |
| 7,649,638 | B2 | 1/2010 | Beard et al. |
| 7,650,085 | B2 | 1/2010 | Kehoe et al. |
| 7,667,874 | B2 | 2/2010 | MacDonald et al. |
| 7,773,239 | B2 | 8/2010 | Beard et al. |
| 8,009,302 | B2 | 8/2011 | Martin |
| 8,139,238 | B2 | 3/2012 | Oki |
| 2004/0012808 | A1* | 1/2004 | Payne et al. ................... 358/1.15 |
| 2004/0034698 | A1* | 2/2004 | Abu-Husein et al. ......... 709/223 |
| 2004/0201867 | A1* | 10/2004 | Katano ........................ 358/1.15 |
| 2010/0103445 | A1 | 4/2010 | Levine et al. |
| 2010/0302573 | A1* | 12/2010 | Hakozaki ..................... 358/1.14 |
| 2010/0332629 | A1 | 12/2010 | Cotugno et al. |
| 2011/0047204 | A1 | 2/2011 | Mansoor et al. |
| 2011/0292431 | A1 | 12/2011 | Cok |
| 2011/0292435 | A1 | 12/2011 | Cok et al. |
| 2012/0293827 | A1 | 11/2012 | Burke, Jr. |

(Continued)

OTHER PUBLICATIONS

B. Pellow, "Moving to the Cloud", Business Development Services Analysis, Nov. 2010, InfoTrends 2010, pp. 1-7.

(Continued)

*Primary Examiner* — Miya J Cato
(74) *Attorney, Agent, or Firm* — Fox Rothschild LLP

(57) ABSTRACT

A cloud administration system for managing service information in a network printing context may include a processing module in communication with a plurality of print devices and a plurality of remote systems, and one or more storage modules in communication with the processing module. The processing module may be configured to receive fault information, store the received fault information, send at least a portion of the fault information to the remote systems, receive response information associated with the at least a portion of the fault information, aggregate the received response information into a set of response information, and cause at least a portion of the set of response information to be displayed at one or more of the print device from which the fault information was received, and a computing device associated with a service technician servicing the print device from which the fault information was received.

20 Claims, 7 Drawing Sheets

(56) References Cited

U.S. PATENT DOCUMENTS

| | | |
|---|---|---|
| 2012/0293828 A1 | 11/2012 | Burke, Jr. |
| 2012/0293829 A1 | 11/2012 | Burke, Jr. |
| 2012/0293830 A1 | 11/2012 | Burke, Jr. |
| 2012/0293831 A1 | 11/2012 | Burke, Jr. |
| 2012/0297375 A1* | 11/2012 | Burke, Jr. ............... 717/173 |
| 2013/0114100 A1* | 5/2013 | Torii et al. ............... 358/1.14 |
| 2013/0188213 A1* | 7/2013 | Burke et al. ............... 358/1.14 |
| 2013/0215452 A1* | 8/2013 | Burke, Jr. ............... 358/1.15 |

OTHER PUBLICATIONS

A. Wawro, "Cloud Printers Rain on Security Parade", PC World, Apr. 2011, vol. 29, No. 4, p. 36.

* cited by examiner

METHOD AND SYSTEM FOR MANAGING SERVICE ACTIVITY IN A NETWORK PRINTING CONTEXT USING A CLOUD ADMINISTRATION SYSTEM

BACKGROUND

Typically, equipment service providers access service call activity through a laptop or mobile device. However, neither laptops nor mobile devices are reliable resources for accessing service call history. A customer may not permit a service provider to connect his or her laptop to the customer's network. Moreover, mobile devices are dependent on a wireless signal that may not be available at all customer locations.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In an embodiment, a cloud administration system for managing service information in a network printing context may include a processing module in communication with a plurality of print devices and a plurality of remote systems. The processing module may be located remotely from the plurality of print devices. The cloud administration system may include one or more storage modules in communication with the processing module. The processing module may be configured to receive fault information from one of the plurality of print devices, store the received fault information in at least one of the storage modules, send at least a portion of the fault information to one or more of the remote systems in communication with the cloud administration system, receive, from the one or more remote systems, response information associated with the at least a portion of the fault information, aggregate the received response information into a set of response information, and cause at least a portion of the set of response information to be displayed at one or more of the print device from which the fault information was received, and a computing device associated with a service technician servicing the print device from which the fault information was received. The cloud administration system may operate as a shared resource for each of the plurality of print devices and the remote system.

In an embodiment, a method of managing service information in a network printing context may include receiving, by a cloud administration system, fault information from a print device. The fault information may include information associated with a fault experienced by the print device. The method may include storing, by the cloud administration system, the received fault information in a storage module, sending, by the cloud administration system, at least a portion of the fault information to one or more remote systems, receiving, from the one or more remote systems, response information associated with the at least a portion of the fault information, aggregating the received response information into a set of response information, and causing at least a portion of the set of response information to be displayed at one or more of the print device, and a computing device associated with a service technician servicing the print device from which the fault information was received.

DETAILED DESCRIPTION

Figure 1:
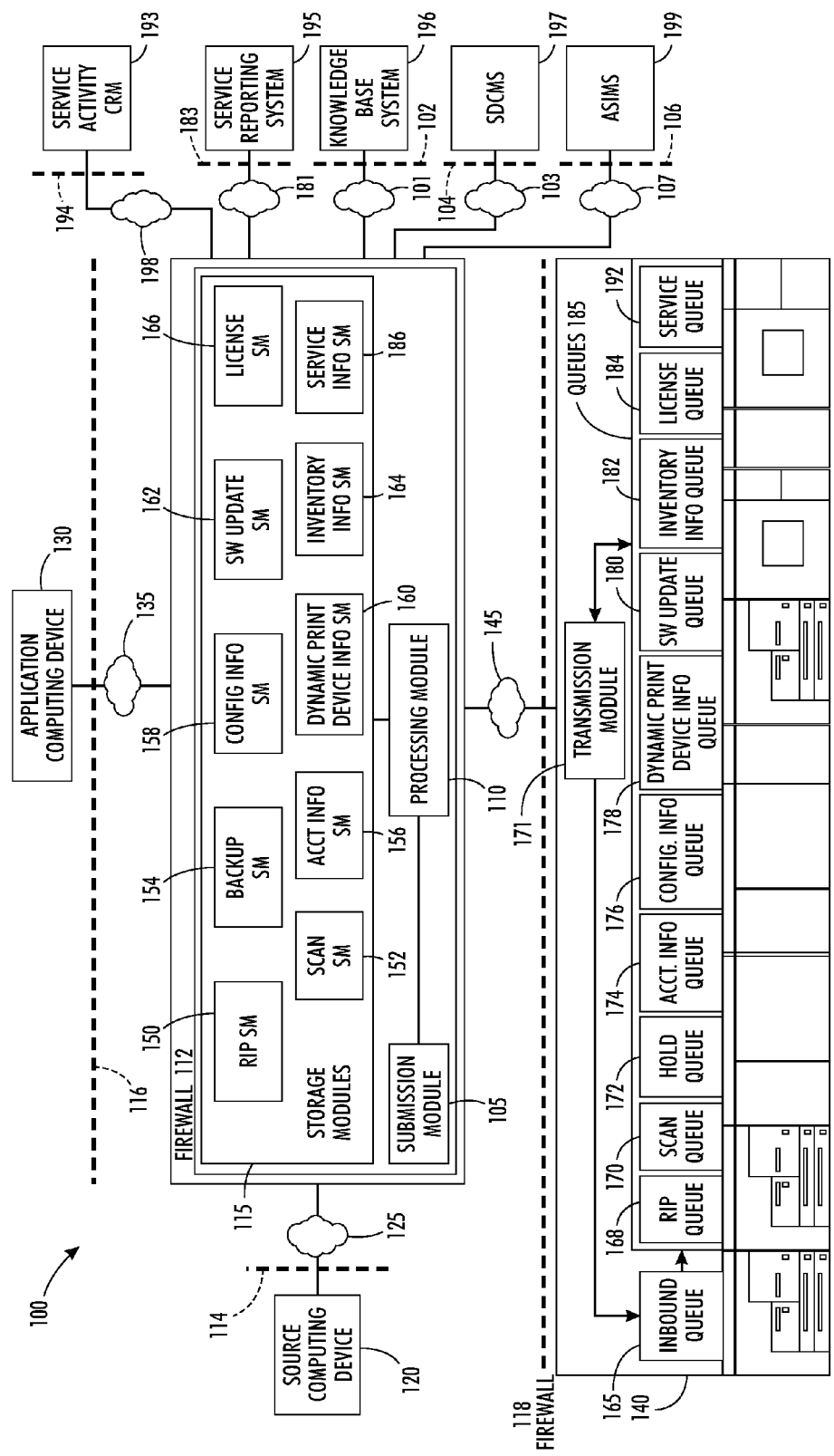
FIGS. 1 and 2 illustrate exemplary cloud administration systems according to an embodiment.

The following terms shall have, for the purposes of this application, the respective meanings set forth below.

An "application computing device" is a computing device capable of sending information to and/or receiving information from a cloud administration system.

A "cloud administration system" refers to one or more physical and/or logical devices that operate as a shared resource for multiple remote print devices and/or computing devices. Logical devices in a cloud administration system may be accessed without any knowledge of the corresponding physical devices.

A "computing device" or a "processor" refers to a computer or other machine that performs one or more operations according to one or more programming instructions. An exemplary computing device or processor is described in reference to FIG. 7.

"Fault information" refers to one or more problem codes, fault codes, problem descriptions and/or the like experienced by and/or associated with a print device.

A "firewall" is hardware and/or software used to protect a resource of a network from unauthorized external access.

A "job" refers to a logical unit of work that is to be completed for a customer.

A "logical device" is a representation of a physical device that uniquely identifies the corresponding physical device. For example, a network interface may be assigned a unique media access control address that is the logical unique identifier of a physical device. As such, a conventional device is a combined logical and physical device in which the logical device provides the entire identity of the physical device.

A "module" is a component of a larger system, such as a cloud administration system.

An "operation" or "print-related function" is a function that is performed on a print job. Exemplary operations may include raster image processing, formatting, stapling, collating, sorting, punching, binding and/or the like.

A "physical device" is a physical resource such as a computing device, a computer-readable storage medium and/or the like.

A "print job" refers to a job that can be processed by a print device. For example, a print job may include a job that is to be printed, scanned or otherwise processed by a print device.

A "print device" refers to a device capable of performing one or more print-related functions. For example, a print device may include a printer, a scanner, a copy machine, a multifunction device, a collator, a binder, a cutter or other similar equipment. A "multifunction device" is a device that is capable of performing two or more distinct print-related functions. For example, a multifunction device may have print and scan capabilities.

A "queue" is a data structure stored on a computer-readable medium and configured to temporarily store information, including, but not limited to, a print job, print device information and/or the like.

The term "remote," as used herein with respect to computing devices and/or print devices, refers to devices that operate on different computer networks and/or computer networks operated by different entities. For example, a computing device is remote from a print device if the computing device is connected to a first LAN operated by a first entity and the print device is connected to a second LAN operated by a second entity.

A "resource" is a physical device having a processor and/or a storage medium. Exemplary resources may include a computing device, a processing device a storage device and/or the like.

"Response information" refers to information that is relevant to resolving one or more faults, issues or problems associated with at least a portion of fault information.

"Service information" refers to information pertaining to the servicing of one or more print devices.

A "service provider" or "service technician" refers to a person providing onsite service.

A "shared resource" is a resource that may be accessed and used by a plurality of other resources.

A "source computing device" is a computing device that is capable of transmitting one or more print jobs to a cloud administration system.

A "storage module" or "SM" is a computer-readable storage medium or portion thereof.

"Virtualization" is a configuration that allows logical devices to exist as an abstraction without being directly tied to a specific physical device. Virtualization may be achieved using logical names instead of physical identifiers. For example, using a uniform resource locator instead of a server's media access control address effectively virtualizes the target server. Alternatively, an assigned media access control address may exist independently of the physical resources managing network traffic.

A cloud administration system may help service providers more effectively respond to and troubleshoot issues experienced by print devices. Typically, service providers access service call activity through a laptop or mobile device. However, neither laptops nor mobile devices are reliable resources for accessing service call history or troubleshooting information. A cloud administration may better enable a service provider to manage and/or access service information, such as, for example, response information and fault information.

Storing service information in a cloud context may provide a service provider a more efficient way to locate, manage and update such service information for print devices. In addition, a cloud administration system may aggregate and/or analyze service information, response information, fault information and/or the like associated with multiple print devices to better assist a service provider in servicing print devices.

FIG. 1 illustrates an exemplary cloud administration system according to an embodiment. As illustrated by FIG. 1, a cloud administration system 100 may include a submission module 105, a processing module 110 and one or more storage modules 115. The submission module 105 and/or one or more of the storage modules 115 may be in communication with the processing module 110. In an embodiment, all communication to or from the cloud administration system 100 may be through a firewall 112.

In an embodiment, a storage module 115 may correspond to an operation or type of operation to be performed on a print job, or it may correspond to the type of information it stores. For example, as illustrated by FIG. 1, the storage modules 115 may include a raster image processing (RIP) storage module 150, a scan storage module 152, a backup storage module 154, an accounting information storage module 156, a configuration information storage module 158, a dynamic print device information storage module 160, a software update storage module 162, an inventory information storage module 164, a license storage module 166, a service information storage module 186 and/or the like. Storage modules 115 are discussed in more detail below.

In an embodiment, a cloud administration system 100 may be in communication with one or more source computing devices 120. A source computing device 120 may be located remotely from the cloud administration system 100. In an embodiment, all source computing devices 120 may be located remotely from the cloud administration system 100. In an embodiment, a source computing device 120 may communicate with a cloud administration system 100 through a plurality of firewalls. For example, a communication from a source computing device 120 to a submission module 105 may pass through a firewall 114 associated with the source computing device and the firewall 112 associated with the cloud administration system 100.

In an embodiment, a source computing device 120 may communicate directly with a cloud administration system 100 over a network 125. In an embodiment, the network 125 may be operated by an entity. An entity may be a corporation, an organization, a group, an individual and/or the like. In an embodiment, a plurality of source computing devices 120 may communicate with the cloud administration system 100 over one or more networks.

In an embodiment, a cloud administration system 100 may be in communication with one or more application computing devices 130. An application computing device 130 may be in communication with the processing module 110 and/or one or more storage modules 115. In an embodiment, an application computing device 130 may communicate with the cloud administration system 100 through a plurality of firewalls. For example, a communication from an application computing device 130 to a processing module 110 may pass through a firewall 116 associated with the application computing device and the firewall 112 associated with the cloud administration system 100.

In an embodiment, an application computing device 130 may be located remotely from the cloud administration system 100. In an embodiment, each application computing device 130 may be located remotely from the cloud administration system 100. In an alternate embodiment, an application computing device 130 may be a component of the cloud administration system 100.

An application computing device 130 may communicate with the cloud administration system 100 over a network 135. In an embodiment, an application computing device 130 may communicate directly with a submission module 105 over a network 135. In an embodiment, an application computing device 130 may communicate with a submission module 105 through one or more firewalls.

An application computing device 130 may be located remotely from a source computing device 120. In an embodiment, each application computing device 130 may be located remotely from each source computing device 120. In an embodiment, the network 135 over which an application computing device 130 may communicate with a cloud administration system 100 may be operated by a different entity than that which operates a network over which a source computing device 120 may communicate with the cloud administration system.

In an embodiment, a cloud administration system 100 may be in communication with one or more print devices 140. A print device 140 may be located remotely from the cloud administration system 100 and may communicate with the cloud administration system over one or more networks 145. In an embodiment, each print device 140 may be located remotely from the cloud administration system 100.

In an embodiment, a print device 140 may communicate with a cloud administration system 100 through a plurality of firewalls. For example, a communication from a print device 140 to a cloud administration system 100 may pass through a firewall 118 associated with the print device and the firewall 112 associated with the cloud administration system 100.

In an embodiment, a print device 140 may be located remotely from a source computing device 120 and an application computing device 130. In an embodiment, each print device 140 may be located remotely from each source computing device 120 and each application computing device 130. In an embodiment, the network 145 over which a print device 140 may communicate with a cloud administration system 100 may be operated by an entity that is different that that which operates a network over which a source computing device 120 may communicate with the cloud administration system and/or a network over which an application computing device 130 may communicate with the cloud administration system.

In an embodiment, a print device 140 may have one or more queues 185 that may be inbound and/or outbound queues. Although inbound and outbound queues are discussed as being separate queues, it is understood that an inbound queue may perform inbound and outbound queue functions, and that an outbound queue may perform outbound and inbound functions.

In an embodiment, a print device 140 may have an inbound queue 165, such as a spooler and/or the like. An inbound spooler may be a queue that receives, stores, schedules and/or requests printing of a print job. In an embodiment, a print device 140 may have one or more outbound queues 185. An outbound queue may store print jobs and/or print device information until the print device transmits these print jobs and/or print device information. For example, as illustrated by FIG. 1, a print device may have a RIP queue 168, a scan queue 170, a hold queue 172, an accounting information queue 174, a configuration information queue 176, a dynamic print device information queue 178, a software update queue 180, an inventory information queue 182, a license queue 184, a service queue 192 and/or the like. Queues 185 are discussed in more detail below.

In an embodiment, a print device 140 may have a transmission module 171. A transmission module may be in communication with one or more queues 185. A transmission module 171 may be configured to transmit data from a print device 140 to a computing device, another print device and/or the like. In an embodiment, a transmission module 171 may be in communication with a cloud administration system 100. For example, a transmission module 171 may be in communication with a processing module 110 of a cloud administration system 100.

In an embodiment, a service activity customer relationship management (CRM) system 193 may communicate with the cloud administration system 100. A service activity CRM system 193 may be located remotely from the cloud administration system 100. A service activity CRM system 193 may include one or more computing devices configured to manage service relationships with one or more customers. A service activity CRM system 193 may manage and organize business processes of a customer such as, for example, sales, marketing, customer service and technical support activities. A service activity CRM system 193 may maintain customer information, such as demographic information, and information pertaining to equipment used by one or more customers. In an embodiment, a service activity CRM system 193 may track customer problems or issues relating to equipment usage, as well as service activity. Any customer or service initiated activity may be managed by a service activity CRM system 193. In an embodiment, a customer or service activity may be initiated through a remote network connection, a phone call, a social media interaction with a customer, a site visit and/or the like. A service activity CRM system 193 system may communicate with a cloud administration system 100 over a network 198 through a firewall 194.

In an embodiment, a service reporting system 195 may communicate with the cloud administration system 100. A service reporting system 195 may be located remotely from the cloud administration system 100. A service reporting system 195 may include one or more computing devices configured to manage historical service activity information. A service reporting system 195 may maintain historical data collected from a variety of sources such as, for example, a print device, or from interactions with a customer. These interactions may include remote device connections, phone conversations, social media interactions, onsite service call records and/or other types of interactions.

In an embodiment, a service reporting system 195 may store summarized and/or formatted information. In an embodiment, a service reporting system 195 may store information derived from systemic or human business intelligence analyses. In an embodiment, a service reporting system 195 may store one or more reliability reports, parts usage reports, device service hours reports, print volume reports, parts usage by print volume reports, response time reports and/or the like. A service reporting system 195 system may communicate with a cloud administration system 100 over a network 181 through a firewall 183.

In an embodiment, a knowledgebase system 196 may communicate with the cloud administration system 100. A knowledgebase system 196 may be located remotely from the cloud administration system 100. A knowledgebase system 196 may include one or more computing devices configured to associate problem codes, fault codes and/or problem descriptions associated with one or more print devices to one or more solutions. A solution may be one or more actions to be performed on a print device or another computing device. A solution may include one or more files that may programmatically solve a problem. A knowledgebase system 196 may connect one or more sources of solution information to a particular problem or fault code definition. For example, a knowledgebase system may link to a third party's Internet-presented solutions through a network connection. A knowledgebase system 196 system may communicate with a cloud administration system 100 over a network 101 through a firewall 102.

In an embodiment, a service documentation content management system (SDCMS) 197 may communicate with the cloud administration system 100. A SDCMS 197 may be located remotely from the cloud administration system 100. A SDCMS 197 may include one or more computing devices configured to present service documentation or other service procedure information such as, for example, videos. Service document or other service procedure information may describe or show one or more steps to adjust or repair a print device or other type of equipment. These procedures may include directed troubleshooting procedures, such as step-by-step troubleshooting procedures. In an embodiment, procedures may include block or other schematic diagrams that may help a service technician repair a print device. If the documentation is electronic, information may be segregated by general repair/adjustment procedures, fault codes, problem description focused procedures, parts lists, subsystem procedures, principle of operation information and/or the like. A SDCMS 197 system may communicate with a cloud administration system 100 over a network 103 through a firewall 104.

In an embodiment, an ancillary service information management system (ASIMS) 199 may communicate with the cloud administration system 100. An ASIMS 199 may be located remotely from the cloud administration system 100. An ASIMS 199 may include one or more computing devices configured to maintain value-added service information not maintained by the service activity CRM 193, service reporting system 195, knowledgebase system 196, or SDCMS 197. An example of such value-added service information may include information collected and/or maintained by service parts inventory management systems that may be used to manage parts inventories of service providers and customer or warehouse based inventories. Another example of value-added service information may include information collected and/or maintained by autonomous business intelligence systems that may be used to analyze historical or real time service or device data. Another example of value-added service information may include information collected and/or maintained by service call logging systems that may allow a service provider to keep a local record that may include notes which may not be captured by a service activity CRM 193. Additional and/or alternate value-added service information may be used within the scope of this disclosure. An ASIMS 199 system may communicate with a cloud administration system 100 over a network 107 through a firewall 106.

In an embodiment, a source computing device 120, an application computing device 130, a print device 140, a service activity CRM 193, a service reporting system 195, a knowledgebase system 196, a SDCMS 197 and/or an ASIMS 199 may not communicate directly with one another. As illustrated by FIG. 1, the source computing device 120, the application computing device 130, the print device 140, the service activity CRM 193, service reporting system 195, knowledgebase system 196, SDCMS 197 and ASIMS 199 may communicate indirectly via a cloud administration system 100.

Figure 2:
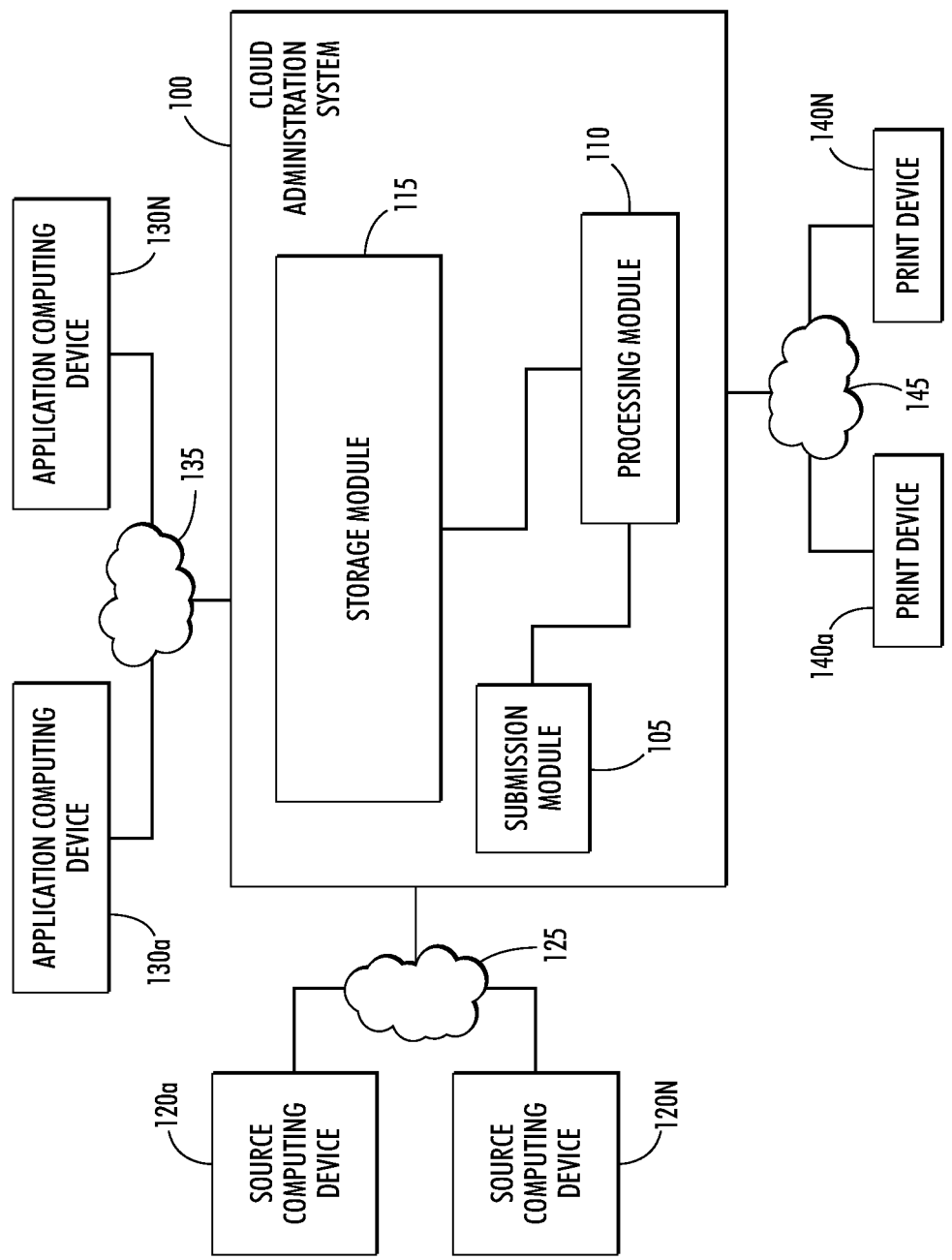

FIG. 2 depicts an exemplary cloud administration system according to an embodiment. As illustrated by FIG. 2, a cloud administration system 100 may communicate with more than one source computing device 120a-N, application computing device 130a-N and/or print device 140a-N.

In an embodiment, a service information storage module 186 may store service information. Service information may refer to information pertaining to the servicing of one or more print devices. In an embodiment, service information may include service call process behavior that a service technician should follow when servicing one or more print devices. For example, service call process behavior may include steps a service technician should take in an effort to resolve certain issues.

In an embodiment, service information may include service documentation. Service documentation may be print device specific and may include diagrams, schematics, equipment information and/or the like pertaining to one or more print devices.

In an embodiment, service information may include knowledgebase information corresponding to a print device type. Knowledgebase information may include service log information, such as, for example, print device specific notes and other information provided by service technicians pertaining to past service calls for one or more print devices. Knowledgebase information may include the issue, problem or fault to be serviced, one or more actions to be taken by the service technician to correct the issue, problem or fault, whether one or more of the actions were successful, a status associated with the print device and/or the like.

In an embodiment, service information may include knowledgebase information pertaining to recent print device fault codes for one or more print devices or print device types, performance data associated with one or more print devices, currently open service call information for one or more print devices, service history information for one or more print devices, service logs for one or more print devices, and/or the like.

In an embodiment, service information may be sent by a cloud administration to one or more print devices. A print device may receive service information from the cloud administration system at regular intervals, such as, for example, once a day. In another embodiment, a print device may receive service information from the cloud administration system periodically. In an embodiment, a print device may receive service information to the cloud administration system in response to the cloud administration system receiving a request for information from the print device. A print device may receive and store the service information. In an embodiment, the service information provided to a print device may be identified by the cloud administration system to be the information having the highest relevance to a current problem associated with the print device.

Figure 3:
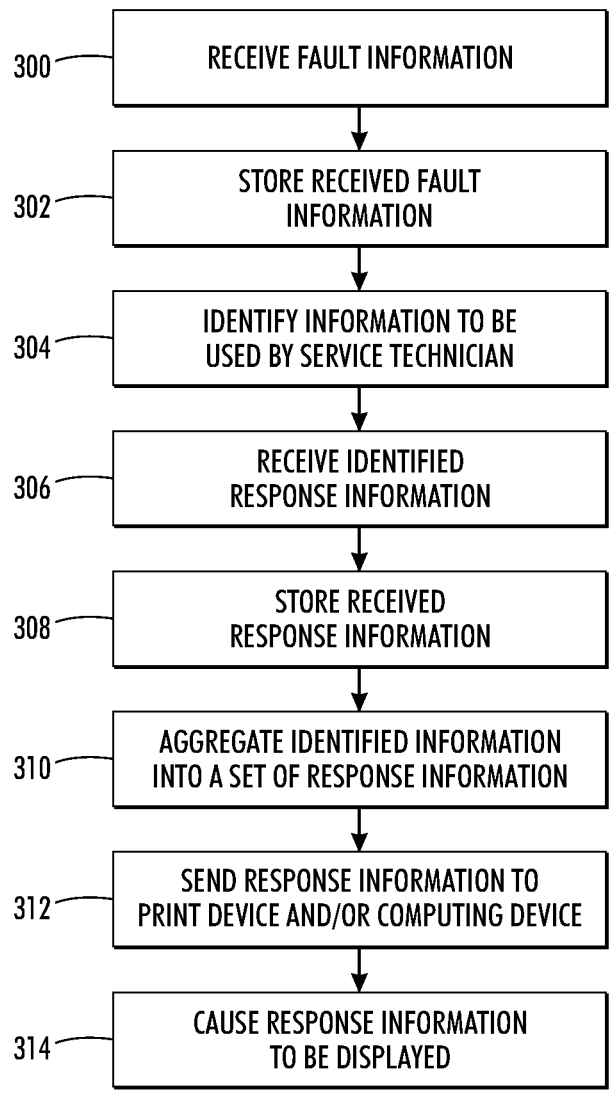
FIG. 3 illustrates a flow chart of an example method of utilizing service information according to an embodiment.

FIG. 3 illustrates a flow chart of an example method of utilizing service information according to an embodiment. As illustrated by FIG. 3, fault information may be received 300 by the cloud system from a print device. In an embodiment, a transmission module and/or a service queue of a print device may send fault information, and a submission module and/or processing module of the cloud administration system may receive 300 the fault information. In an embodiment, the cloud administration system may store 302 the received fault information in, for example, the service information storage module.

In an embodiment, the cloud system may identify 304 information from the service activity CRM, the service reporting system, the knowledgebase system, the SDCMS and/or the ASIMS that may be used by a service technician to address the fault information. For example, cloud system may receive 300 fault information from a print device that includes fault code "18." The cloud system may identify 304 response information from the service activity CRM, the service reporting system, the knowledgebase system, the SDCMS and/or the ASIMS that may be used to address a fault having a fault code of "18." For example, the cloud system may identify 304 one or more documents from the knowledgebase system, one or more pages from the SDCMS and information about one or more parts at the customer site from the ASIMS that may be used to resolve a fault having a fault code of "18." Additional and/or alternate information may be used within the scope of this disclosure.

In an embodiment, a cloud system may identify 304 response information by sending one or more remote systems, such as, for example, the service activity CRM, the service reporting system, the knowledgebase system, the SDCMS and/or the ASIMS, at least a portion of the received fault information. A remote system may search its databases or other repositories to identify response information that may be used to address the received fault information. A remote system may send the identified response information to the cloud system.

In an embodiment, the cloud system may receive 306 identified response information from one or more remote systems. The cloud system may store 308 the received response information in the service information storage module according to an embodiment.

In an embodiment, the cloud system may aggregate 310 the identified information into a set of response information, and may send 312 the response information to the print device and/or another computing device. For example, a cloud system may send the response information to a computing device, such as, for example, a mobile phone or a tablet, associated with a service technician who is servicing the print device. In an embodiment, the cloud system may cause at least a portion of the response information to be displayed 314 at a computing device. For example, the cloud system may cause at least a portion of the response information to be displayed 314 on a screen or other interface of the print device, at a computing device associated with the service technician servicing the print device and/or the like.

Figure 4:
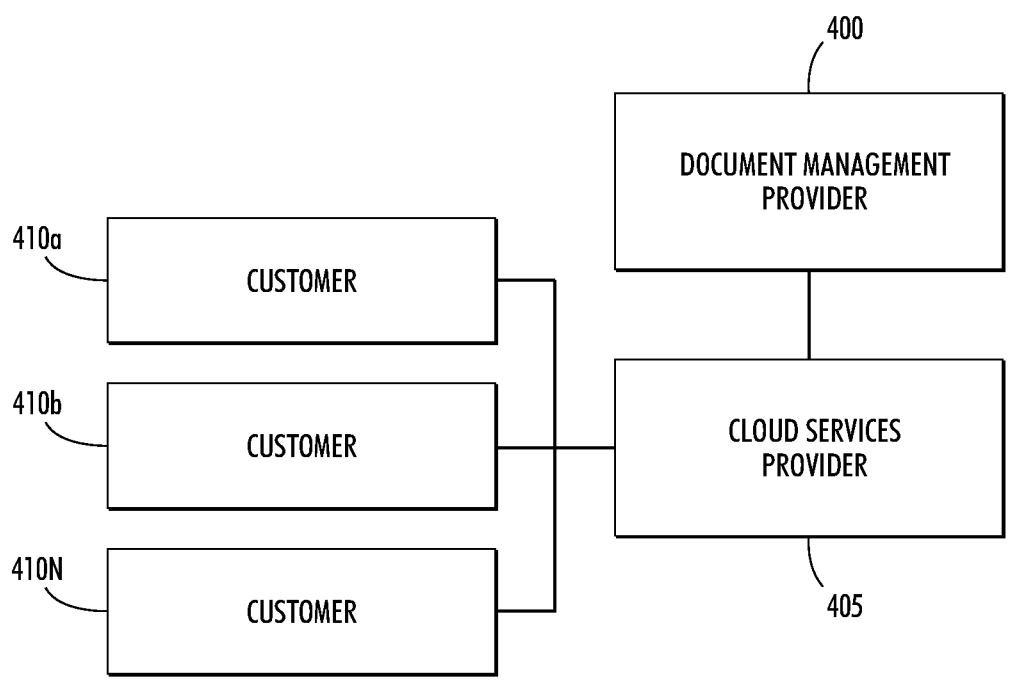
FIG. 4 illustrates an exemplary implementation of a cloud administration system according to an embodiment.

FIG. 4 illustrates an example implementation of a cloud administration system according to an embodiment. A document management provider 400 may contract with a cloud services provider 405 to provide cloud services to the document management provider's customers 410*a*-N. A document management provider 400 may be an entity that supplies, manages and/or maintains print devices, processes print jobs and/or performs other document management services. A cloud services provider 405 may operate and/or maintain a cloud administration system to provide cloud services. Cloud services may describe applications that may be accessed on demand from a cloud services provider that hosts the applications. Cloud services may include applications for document management, document processing, account management, print device configuration, document retention and backup, inventory management, stock analysis, fault analysis and/or the like. In an embodiment, a computing device operated by a customer 410*a*-N may communicate directly with a cloud administration system.

Figure 5:
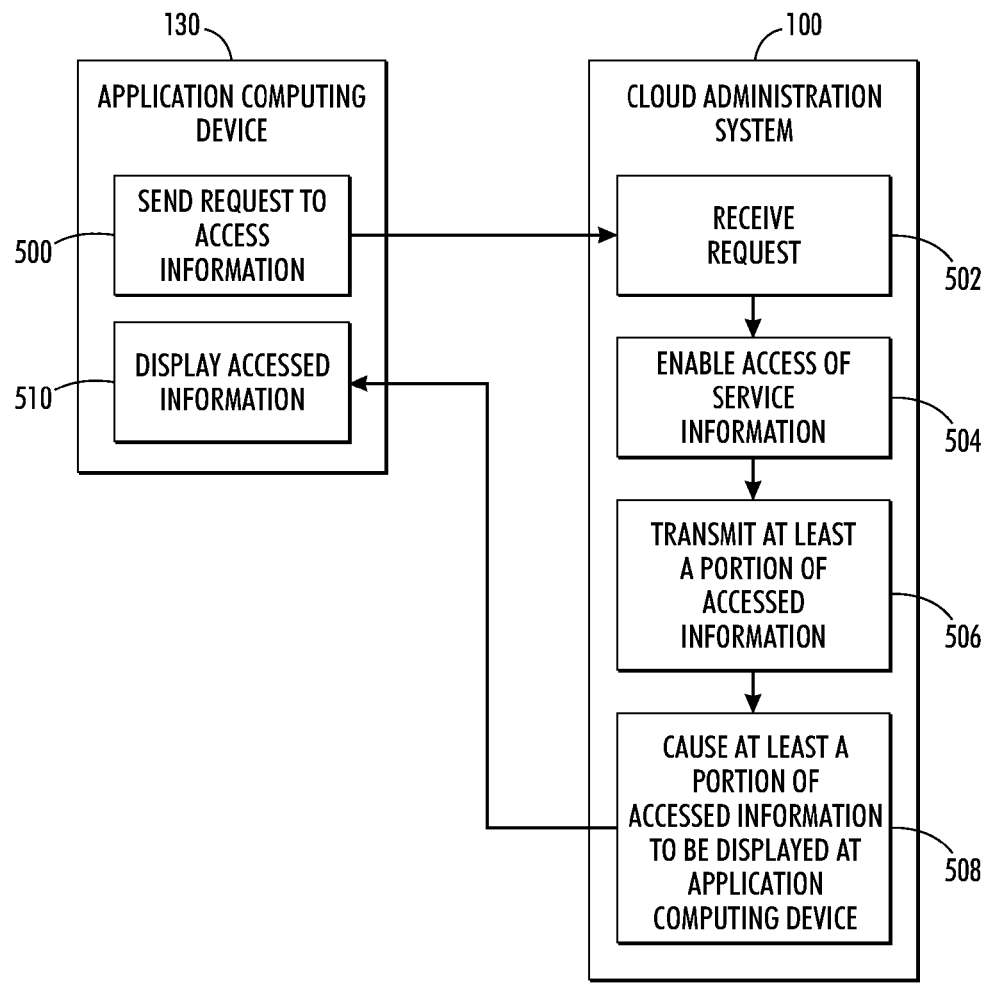
FIGS. 5 and 6 illustrate flow charts of an example methods of accessing information from a cloud administration system by an application computing device according to various embodiments.

FIG. 5 illustrates a flow chart of an example method of accessing information from a cloud administration system by an application computing device according to an embodiment. As illustrated by FIG. 5, an application computing device may send 500 a request to access information from the cloud administration system. In an embodiment, an application computing device may be a computing device used by a service technician in the field. For example, a service technician may use a laptop computer, tablet computer or other portable computing device to service one or more print devices in the field, such as, for example, at a customer's site.

In an embodiment, the cloud administration system may receive 502 a request to access information, and may enable 504 the application computing device to access at least a portion of information from the cloud administration system. In an embodiment, a cloud administration system may enable 504 an application computing device to access at least a portion of service information from the service information storage module. In an embodiment, the cloud administration system may transmit 506 at least a portion of service information to an application computing device. A cloud administration system may cause 508 at least a portion of the service information to be displayed at the application computing device. The application computing device may display 510 at least a portion of the service information.

For example, a service technician may want to access service logs, service workflows, best practices and/or the like for the particular print device and/or the type of print device being serviced. The service technician may, via an application computing device, request 500 this information and the cloud administration system may enable 504 the application computing device to access this information.

Figure 6:
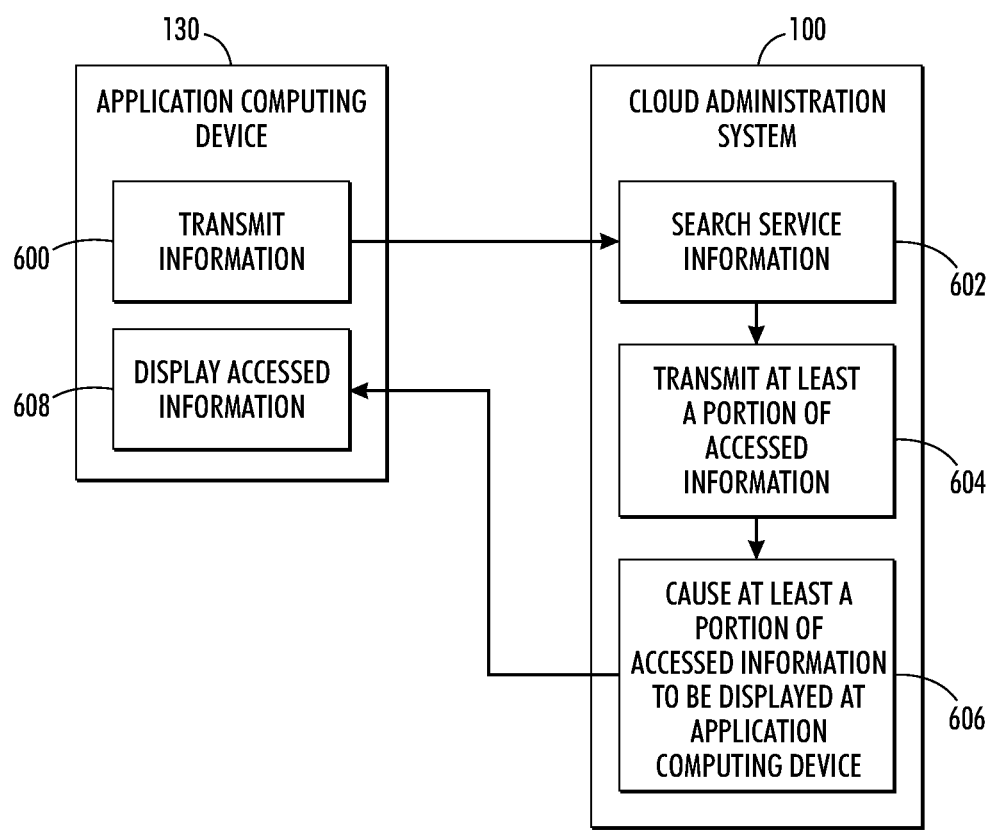

In an embodiment, as illustrated by FIG. 6, a service technician may provide information pertaining to fault experienced by a print device via an application computing device. The application computing device may transmit 600 the provided information to a cloud administration system. The cloud administration system may search 602 the stored service information using the transmitted information, and may find one or more recommended solutions, causes, courses of action and/or the like. The cloud administration system may transmit 604 this information to the application computing device and may cause 606 at least a portion of this information to be displayed at the application computing device. The application computing device may display 608 at least a portion of the service information.

Figure 7:
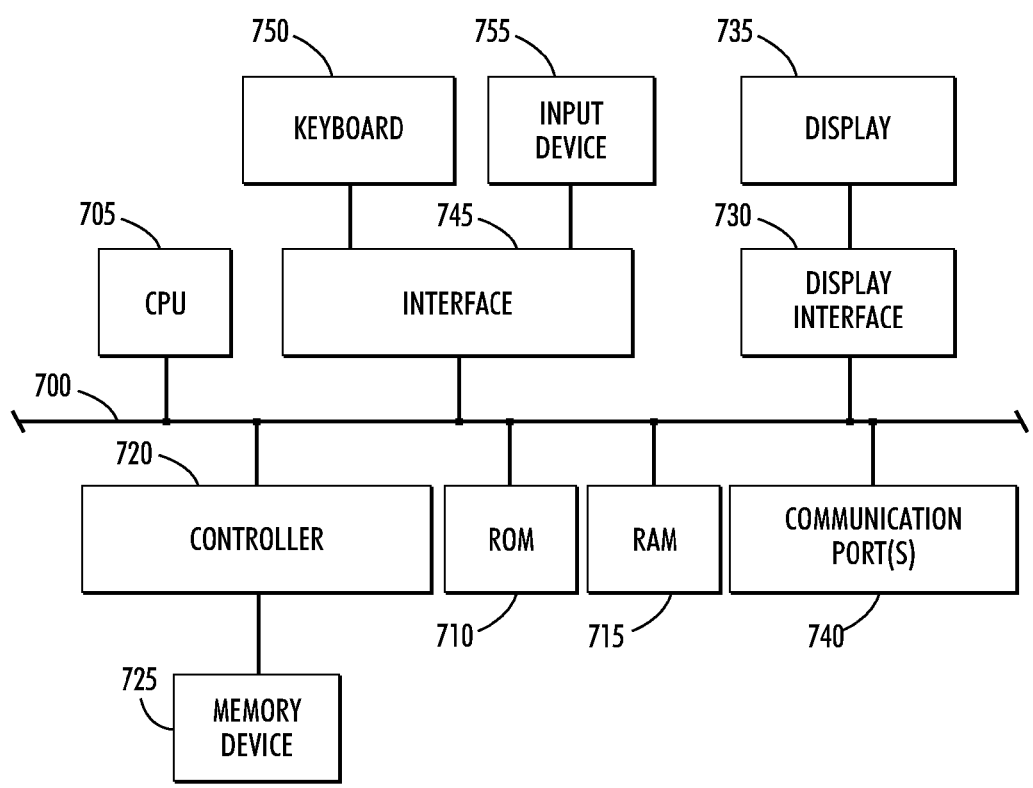
FIG. 7 depicts a block diagram of exemplary internal hardware that may be used to contain or implement program instructions according to an embodiment.

FIG. 7 depicts a block diagram of exemplary internal hardware that may be used to contain or implement program instructions according to embodiments. A bus 700 serves as the main information highway interconnecting the other illustrated components of the hardware. CPU 705 is the central processing unit of the system, performing calculations and logic operations required to execute a program. CPU 705, alone or in conjunction with one or more of the other elements disclosed in FIG. 7, is an exemplary processing device, computing device or processor as such terms are used within this disclosure. Read only memory (ROM) 710 and random access memory (RAM) 715 constitute exemplary memory devices or processor-readable storage media.

A controller 720 interfaces with one or more optional memory devices 725 to the system bus 700. These memory devices 725 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 710 and/or the RAM 715. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

An optional display interface 730 may permit information from the bus 700 to be displayed on the display 735 in audio, visual, graphic or alphanumeric format. Communication with external devices, such as a print device, may occur using various communication ports 740. An exemplary communication port 740 may be attached to a communications network, such as the Internet or an intranet.

The hardware may also include an interface 745 which allows for receipt of data from input devices such as a keyboard 750 or other input device 755 such as a mouse, a joystick, a touch screen, a remote control, a pointing device, a video input device and/or an audio input device.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A cloud administration system for managing service information in a network printing context, the system comprising:
    a processing module in communication with a plurality of print devices and a plurality of remote systems, wherein the processing module is located remotely from the plurality of print devices; and
    one or more storage modules in communication with the processing module,
    wherein the processing module is configured to:
        receive fault information from one of the plurality of print devices,
        store the received fault information in at least one of the storage modules,
        send at least a portion of the fault information to one or more of the remote systems in communication with the cloud administration system,
        receive, from the one or more remote systems, response information associated with the at least a portion of the fault information,
        aggregate the received response information into a set of response information,
        cause at least a portion of the set of response information to be displayed at one or more of:
            the print device from which the fault information was received, and
            a computing device associated with a service technician servicing the print device from which the fault information was received,
    wherein the cloud administration system operates as a shared resource for each of the plurality of print devices and the remote system.

2. The cloud administration system of claim 1, wherein the processing module is configured to receive fault information from a service queue associated with at least one of the plurality of print devices.

3. The cloud administration system of claim 1, wherein the processing module is configured to receive response information from a service activity customer relationship management system.

4. The cloud administration system of claim 1, wherein the processing module is configured to receive response information from a service reporting system, wherein the response information comprises historical service activity associated with one or more print devices.

5. The cloud administration system of claim 1, wherein the processing module is configured to receive response information from a service reporting system, wherein the response information comprises one or more of the following:
    a reliability report;
    a parts usage report;
    a device service hours report;
    a print volume report; and
    a response time report.

6. The cloud administration system of claim 1, wherein the processing module is configured to receive response information from a knowledgebase system, wherein the response information comprises one or more actions to be performed to resolve a fault associated with the fault information.

7. The cloud system of claim 6, wherein the response information comprises information pertaining to past service calls for one or more print devices.

8. The cloud administration system of claim 1, wherein the processing module is configured to receive response information from a service documentation content management system, wherein the response information comprises service procedure information that describes one or more steps to resolve a fault associated with the fault information.

9. The cloud administration system of claim 8, wherein the service procedure information comprises one or more of the following:
    a video;
    one or more troubleshooting procedures for resolving the fault; and
    one or more schematic diagrams.

10. The cloud administration system of claim 1, wherein the processing module is configured to receive response information from a service documentation content management system, wherein the response information comprises one or more of the following:
    part inventory information; and
    service call information.

11. A method of managing service information in a network printing context, the method comprising:
    receiving, by a cloud administration system, fault information from a print device, wherein the fault information comprises information associated with a fault experienced by the print device;
    storing, by the cloud administration system, the received fault information in a storage module;
    sending, by the cloud administration system, at least a portion of the fault information to one or more remote systems;
    receiving, from the one or more remote systems, response information associated with the at least a portion of the fault information;
    aggregating the received response information into a set of response information;
    causing at least a portion of the set of response information to be displayed at one or more of:
        the print device, and
        a computing device associated with a service technician servicing the print device from which the fault information was received.

12. The method of claim 11, wherein receiving fault information comprises receiving fault information from a service queue associated with the print device.

13. The method of claim 11, wherein receiving response information comprises receiving response information from a service activity customer relationship management system.

14. The method of claim 11, wherein receiving response information comprises receiving response information from a service reporting system, wherein the response information comprises historical service activity associated with one or more print devices.

15. The method of claim 11, wherein receiving response information comprises receiving response information from a service reporting system, wherein the response information comprises one or more of the following:
    a reliability report;
    a parts usage report;
    a device service hours report;
    a print volume report; and
    a response time report.

16. The method of claim 11, wherein receiving response information comprises receiving response information from a knowledgebase system, wherein the response information comprises one or more actions to be performed to resolve a fault associated with the fault information.

17. The method of claim 16, wherein the response information comprises information pertaining to past service calls for one or more print devices.

18. The method of claim 11, wherein receiving response information comprises receiving response information from a service documentation content management system, wherein the response information comprises service procedure information that describes one or more steps to resolve a fault associated with the fault information.

19. The method of claim 18, wherein the service procedure information comprises one or more of the following:
- a video;
- one or more troubleshooting procedures for resolving the fault; and
- one or more schematic diagrams.

20. The method of claim 11, wherein receiving response information comprises receiving response information from a service documentation content management system, wherein the response information comprises one or more of the following:
- part inventory information; and
- service call information.

* * * * *